United States Patent
Lee et al.

(10) Patent No.: US 9,608,252 B2
(45) Date of Patent: Mar. 28, 2017

(54) SECONDARY BATTERY AND SECONDARY BATTERY MODULE

(71) Applicant: SAMSUNG SDI CO., LTD., Yongin-si, Gyeonggi-do (KR)

(72) Inventors: Hyun-Soo Lee, Yongin-si (KR); Jang-Hyun Song, Yongin-si (KR); Myung-Jae Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 246 days.

(21) Appl. No.: 14/476,721

(22) Filed: Sep. 3, 2014

(65) Prior Publication Data

US 2015/0180008 A1    Jun. 25, 2015

(51) Int. Cl.
| | |
|---|---|
| *H01M 2/30* | (2006.01) |
| *H01M 2/20* | (2006.01) |
| *H01M 4/64* | (2006.01) |
| *H01M 2/22* | (2006.01) |

(52) U.S. Cl.
CPC ............ *H01M 2/30* (2013.01); *H01M 2/204* (2013.01); *H01M 2/206* (2013.01); *H01M 2/22* (2013.01)

(58) Field of Classification Search
CPC ........ H01M 2/204; H01M 2/206; H01M 2/22; H01M 2/30
See application file for complete search history.

(56) References Cited

U.S. PATENT DOCUMENTS

| | | | |
|---|---|---|---|
| 2009/0104525 A1* | 4/2009 | Nakagawa | H01M 2/263 429/209 |
| 2011/0159353 A1 | 6/2011 | Byun et al. | |
| 2011/0287300 A1* | 11/2011 | Byun | H01M 2/202 429/158 |
| 2011/0311863 A1 | 12/2011 | Byun et al. | |

FOREIGN PATENT DOCUMENTS

| | | |
|---|---|---|
| EP | 2 312 674 A1 | 4/2011 |
| EP | 2 312 675 A1 | 4/2011 |

(Continued)

OTHER PUBLICATIONS

English machine translation of Japanese Publication 2011-014276 A dated Jan. 20, 2011, (10 pages).

(Continued)

*Primary Examiner* — Carlos Barcena
(74) *Attorney, Agent, or Firm* — Lewis Roca Rothgerber Christie LLP

(57) ABSTRACT

A secondary battery of a secondary battery module includes an electrode assembly including a first electrode plate, a second electrode plate, and a separator between the first and second electrode plates, a case accommodating the electrode assembly, a cap plate coupled to the case, and first and second terminals each having a flat shape and each coupled to the cap plate. The first terminal may include a first terminal plate electrically coupled to the first electrode plate and formed of a first material. The second terminal may include a second terminal plate electrically coupled to the second electrode plate and further including a first part formed of a second material different from the first material, and a second part formed integrally with the first part and formed of the first material.

19 Claims, 7 Drawing Sheets

(56) References Cited

FOREIGN PATENT DOCUMENTS

| | | |
|---|---|---|
| EP | 2 372 814 A2 | 10/2011 |
| EP | 2 410 595 A1 | 1/2012 |
| JP | 2011-014276 A | 1/2011 |
| JP | 2012-160339 A | 8/2012 |
| JP | 2013-033661 A | 2/2013 |
| KR | 10-2011-0076738 A | 7/2011 |
| KR | 10-2013-0049984 A | 5/2013 |

OTHER PUBLICATIONS

English machine translation of Japanese Publication 2013-033661 A dated Feb. 14, 2013, (39 pages).
KIPO Office action dated May 23, 2016, for Korean priority Patent application 10-2013-0161773, (10 pages).
Machine English Translation of JP 2012-160339 A, 20 pages.
European Search Report, dated Jul. 22, 2014 for European Patent Application No. 14167283.2, 5 pages.

\* cited by examiner

SECONDARY BATTERY AND SECONDARY BATTERY MODULE

CROSS-REFERENCE TO RELATED APPLICATION

This application claims priority to and the benefit of Korean Patent Application No. 10-2013-0161773, filed on Dec. 23, 2013, in the Korean Intellectual Property Office, the entire disclosure of which is incorporated herein by reference.

BACKGROUND

1. Field

Aspects of the present invention relate to a secondary battery and a secondary battery module.

2. Description of the Related Art

Unlike primary batteries, secondary batteries are rechargeable, and the use of second batteries has become popular due to the economical and eco-friendly aspects of their operation and utility.

Based on the types and applications of use, secondary batteries in devices may be used individually or in the form of battery modules each having a plurality of secondary batteries connected as a unit.

SUMMARY

One or more embodiments of the present invention relate to a secondary battery and a secondary battery module.

Additional aspects of embodiments of the present invention will be set forth in part in the description which follows and, in part, will be apparent from the description, or may be learned by practice of the presented embodiments.

According to one or more embodiments of the present invention, a secondary battery includes an electrode assembly including a first electrode plate, a second electrode plate, and a separator between the first and second electrode plates, a case accommodating the electrode assembly, a cap plate coupled to the case, and a first terminal and a second terminal each having a flat shape and each coupled to the cap plate. The first terminal may include a first terminal plate electrically coupled to the first electrode plate and formed of a first material. The second terminal may include a second terminal plate electrically coupled to the second electrode plate and further including a first part formed of a second material different from the first material, and a second part integrally formed with the first part and formed from the first material.

The secondary battery may further include a first insulator between the first terminal plate and the cap plate defining a first gap between the first insulator and the first terminal plate.

The first terminal may further include a first collector integral with the first terminal plate and penetrating through the first insulator to couple to the first electrode plate. The first electrode plate and the first collector may be formed of the first material.

The first terminal plate may include a first guide at an end portion.

The first terminal plate may further include a first protrusion extending out from a top surface of the first terminal plate parallel with the first guide, the first protrusion being spaced from the first guide.

The secondary battery may further include a second insulator between the second terminal plate and the cap plate and defining a second gap between the second insulator and the second terminal plate.

The second terminal may further include a second collector integral with the first part and penetrating through the second insulator to couple to the second electrode plate. The second electrode plate and the second collector may be formed of the second material.

The second part may include a second guide at an end portion.

The second part may further include a second protrusion extending out from a top surface of the second part parallel with the second guide, the second protrusion being spaced from the second guide.

According to one or more embodiments of the present invention, a secondary battery module includes a plurality of secondary batteries arranged parallel with each other, and a plurality of bus bars electrically coupling adjacent secondary batteries of the plurality of secondary batteries. Each secondary battery of the plurality of secondary batteries may include an electrode assembly including a first electrode plate, a second electrode plate, and a separator between the first and second electrode plates, a case accommodating the electrode assembly, a cap plate coupled to the case, and a first terminal and a second terminal each having a flat shape and each coupled to the cap plate. The first terminal of each secondary battery may include a first terminal plate electrically coupled to the first electrode plate and formed from a first material. The second terminal of each secondary battery may include a second terminal plate electrically coupled to the second electrode plate and further includes a first part formed from a second material different from the first material, and a second part formed integrally with the first part and formed of the first material. The plurality of bus bars may be formed from the first material, each of the bus bars of the plurality of bus bars being coupled to the first terminal plate and the second part of a pair of adjacent secondary batteries of the plurality of secondary batteries.

Each secondary battery may further include a first insulator between the first terminal plate and the cap plate defining a first gap between the first insulator and the first terminal plate, and a second insulator between the second terminal plate and the cap plate defining a second gap between the second insulator and the second terminal plate.

The first gap and the second gap of each secondary battery may overlap with the respective bus bar of the plurality of bus bars.

The first terminal of each secondary battery may further include a first collector integral with the first terminal plate and penetrating through the first insulator to couple to the first electrode plate, the first electrode plate and the first collector being formed from the first material. The second terminal of each secondary battery may further include a second collector integral with the first part and penetrating through the second insulator to couple to the second electrode plate, the second electrode plate and the second collector being formed from the second material.

The first terminal plate of the secondary battery may include a first guide formed at an end portion, the first guide contacting a bus bar, and defining a welding line at a boundary between the first guide and the bus bar.

The first terminal plate of each secondary battery may further include a first protrusion extending out from a top surface of the first terminal plate with the bus bar between the first protrusion and the first guide.

The first protrusion, the first guide, and the bus bar of each secondary battery may have the same thickness.

The second part of each secondary battery may include a second guide at an end portion, the second guide contacting a bus bar, and defining a welding line at a boundary between the second guide and the bus bar.

The second part of each secondary battery may further include a second protrusion extending out from a top surface of the second part with the bus bar between the second protrusion and the second guide.

The second protrusion, the second guide, and the bus bar of each secondary battery may have the same thickness.

The first material may include aluminum, and the second material may include copper.

BRIEF DESCRIPTION OF THE DRAWINGS

These and/or other aspects of embodiments of the present invention will become apparent and more readily appreciated from the following description of the embodiments, taken in conjunction with the accompanying drawings, in which.

DETAILED DESCRIPTION

Figure 1:
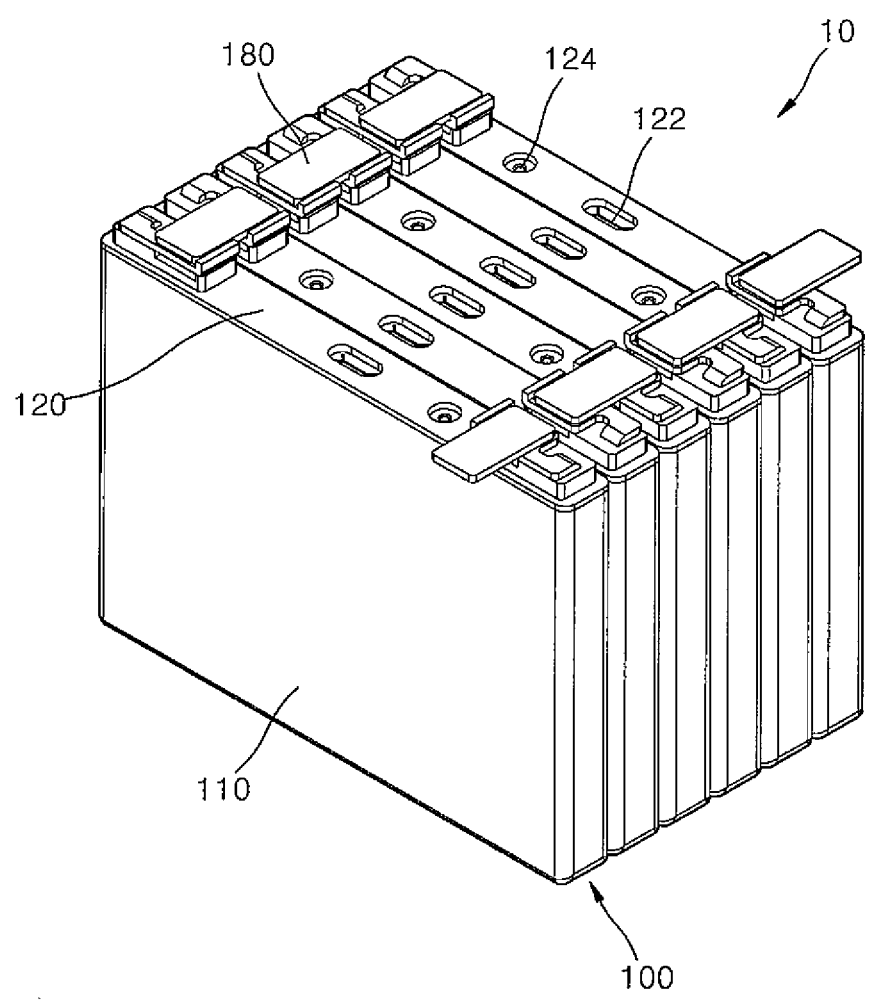
FIG. 1 is a perspective view illustrating a secondary battery module according to an embodiment of the present invention.

Reference will now be made in detail to embodiments of the present invention, examples of which are illustrated in the accompanying drawings. The present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. In the descriptions of the embodiments, like reference numerals denote like elements.

It will be understood that although the terms "first" and "second" are used herein to describe various elements, these elements should not be limited by these terms. These terms are only used to distinguish one element from another element or from other elements.

In the following description, the terms are used only for explaining a specific embodiments, while not limiting the present invention. The meaning of "include" or "comprise" specifies a property, a fixed number, a step, a process, an element, a component, and/or a combination thereof but does not exclude other properties, fixed numbers, steps, processes, elements, components, and/or combinations thereof.

Hereinafter, the embodiments of the present invention will be described in further detail with reference to the accompanying drawings.

Figure 2:
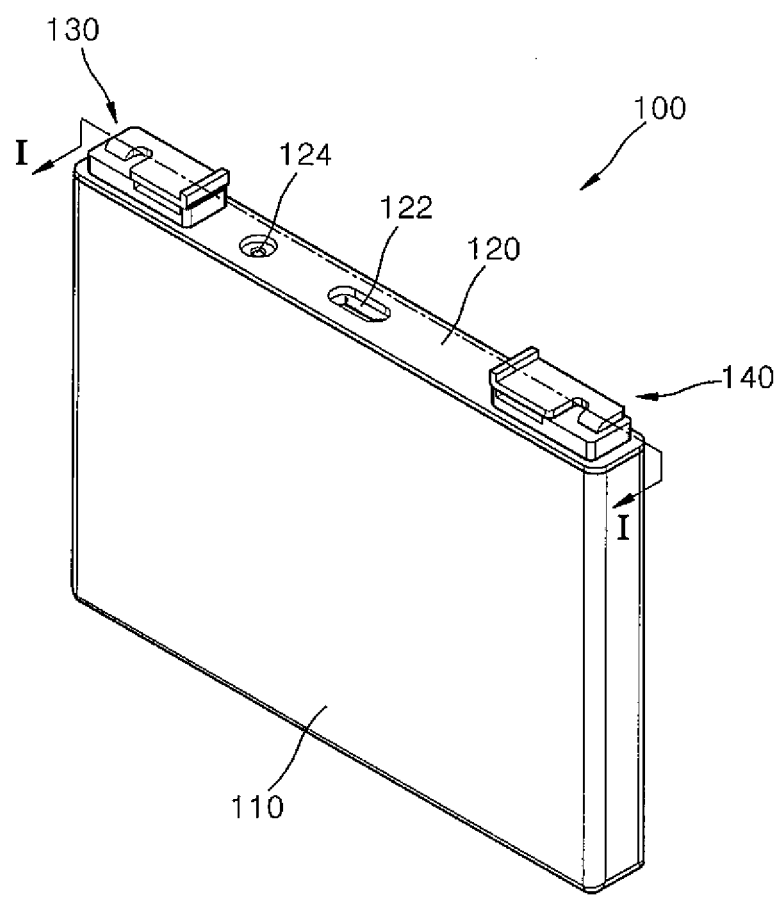
FIG. 2 is a perspective view illustrating a secondary battery of the secondary battery module depicted in FIG. 1.
Figure 3:
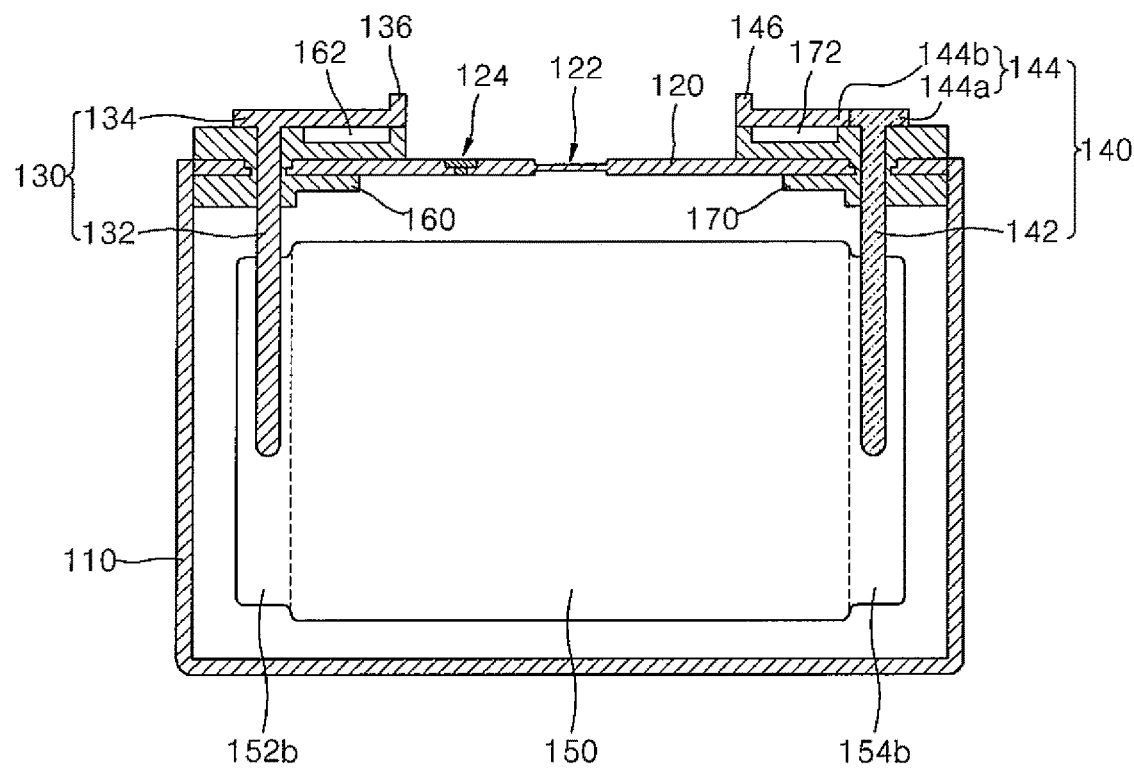
FIG. 3 is a cross-sectional view of the secondary battery of FIG. 2 taken along the line I-I of FIG. 2.
Figure 4:
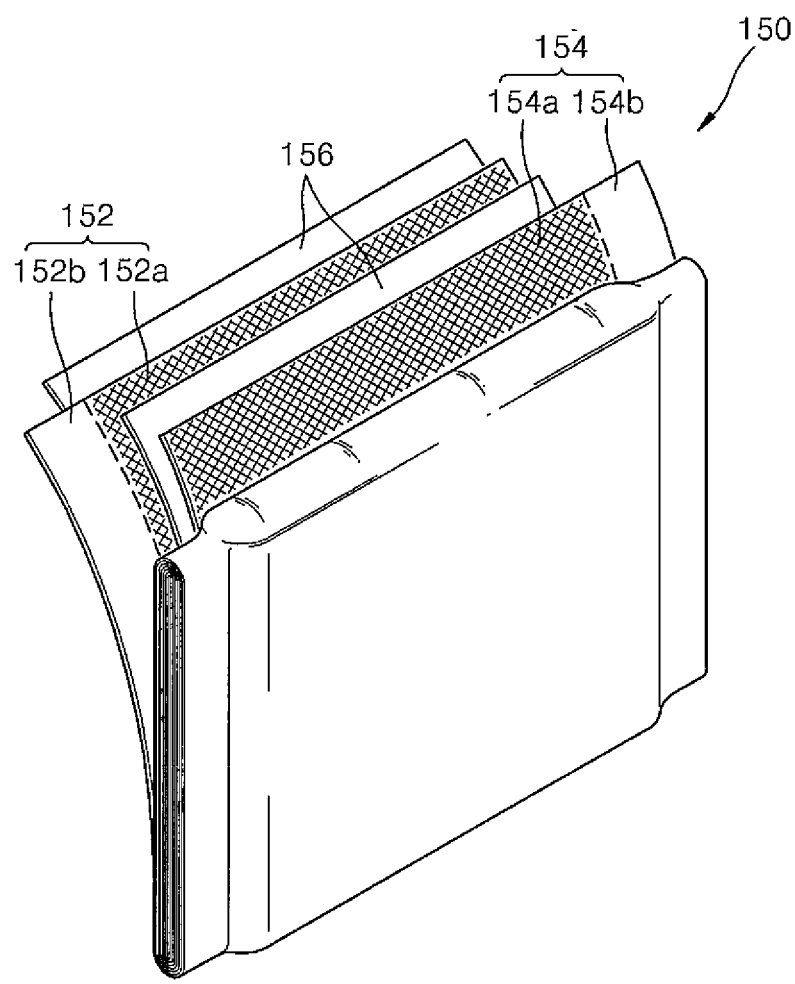
FIG. 4 is a perspective view illustrating an electrode assembly of the secondary battery depicted in FIG. 3.
Figure 5:
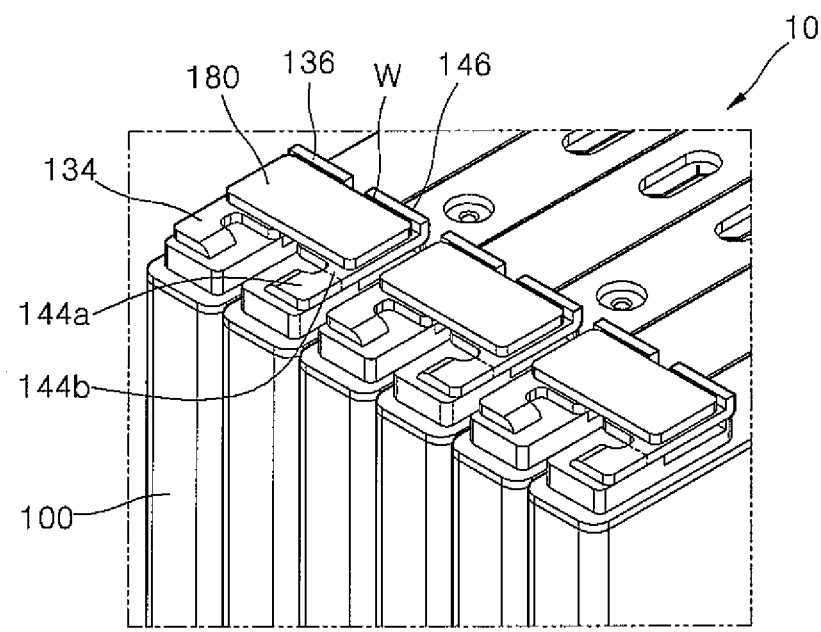
FIG. 5 is a perspective view illustrating a portion of the secondary battery module depicted in FIG. 1.

FIG. 1 is a perspective view illustrating a secondary battery module 10 according to an embodiment of the present invention. FIG. 2 is a perspective view illustrating a secondary battery 100 of the secondary battery module 10 depicted in FIG. 1. FIG. 3 is a cross-sectional view taken of the secondary battery 100 taken along the line I-I of FIG. 2. FIG. 4 is a perspective view illustrating an electrode assembly 150 of the secondary battery 100 depicted in FIG. 3. FIG. 5 is a perspective view illustrating a portion of the secondary battery module 10 depicted in FIG. 1.

Referring to the embodiments illustrated in FIGS. 1 through 5, the secondary battery module 10 may include a plurality of secondary batteries 100 arranged in a direction and parallel with each other, and a plurality of bus bars 180 electrically coupling the plurality of secondary batteries 100.

Each of the plurality of secondary batteries 100 of the secondary battery module 10 may include an electrode assembly 150, a case 110 accommodating the electrode assembly 150, a cap plate 120 sealing the case 110, and a first terminal 130 and a second terminal 140 each coupled to the cap plate 120, according to an embodiment. In addition, each of the secondary batteries 100, in an embodiment, may further include a first insulator 160 between the cap plate 120 and the first terminal 130 and a second insulator 170 between the cap plate 120 and the second terminal 140.

The electrode assembly 150, according to an embodiment, may include a first electrode plate 152, a second electrode plate 154, and a separator 156 between the first electrode plate 152 and the second electrode plate 154. For example, as shown in FIG. 4, the electrode assembly 150, in an embodiment, may be manufactured in the shape of a jelly roll by sequentially stacking and winding the first electrode plate 152, the separator 156, and the second electrode plate 154. Alternatively, in another embodiment, the electrode assembly 150 may be manufactured by sequentially stacking the first electrode plate 152, the separator 156, and the second electrode plate 154 and repeating the sequential stacking a plurality of times.

The first electrode plate 152, according to an embodiment, may include a first active material portion 152a coated with a first active material, and a first non-coating portion 152b without the first active material coating. In an embodiment, for example, the first active material portion 152a may be formed by partially coating at least one side of an aluminum plate with the first active material, with the remaining portion of the aluminum plate that is not coated with the first active material constituting the first non-coating portion 152b. The first active material, according to an embodiment, may be a positive electrode active material, for example, a lithium-containing transition metal oxide such as $LiCoO_2$, $LiNiO_2$, $LiMnO_2$, or $LiMnO_4$, or a lithium chalcogenide.

The second electrode plate 154, according to an embodiment, may include a second active material portion 154a coated with a second active material, and a second non-coating portion 154b without the second active material coating. In an embodiment, for example, the second active material portion 154a may be formed by partially coating at least one side of a copper plate with the second active material, with the remaining portion of the copper plate that is not coated with the second active material constituting the second non-coating portion 154b. The second active material, according to an embodiment, may be a negative electrode active material, for example, a carbon material such as crystalline carbon, amorphous carbon, a carbon composite, or a carbon fiber, a lithium metal, or a lithium alloy.

In an embodiment, the separator 156 may be manufactured, for example, by coating a base film with a co-polymer of polyvinylidene fluoride and hexafluoro propylene (PVDF-HFP co-polymer). In an embodiment, the base film may be one selected from the group consisting of co-polymers of polyethylene (PE), polystyrene (PS), polypropylene (PP) and polyethylene (PE), and polypropylene (PP). However, the material of the separator 156 is not limited thereto.

In an embodiment where the first electrode plate 152, the separator 156, and the second electrode plate 154 are wound, the first electrode plate 152 and the second electrode plate 154 may be oppositely positioned with respect to the separator 156 such that the first non-coating portion 152b is positioned at one end of the electrode assembly 150 and the second non-coating portion 154b is positioned at the other end of the electrode assembly 150. More specifically, in this embodiment, the first non-coating portion 152b and the second non-coating portion 154b may be positioned at opposite ends along a width of the electrode assembly 150.

An upper side of the case 110, according to an embodiment, may define an opening through which to insert the electrode assembly 150 into the case 110. The case 110, according to an embodiment, may be formed of a conductive material such as aluminum or an aluminum alloy. The case 110, according to this embodiment, may protect the electrode assembly 150 from external shocks, and during charging and discharging operations of the electrode assembly 150, the case 110 may function as a heat-dissipation plate to dissipate heat generated from the electrode assembly 150 to an exterior of the secondary battery 100.

The cap plate 120, according to an embodiment, may be formed from the same material as the case 110. According to an embodiment, after the electrode assembly 150 is inserted into the case 110, the cap plate 120 may be coupled from a side of the case 110, for example, by welding, to seal the case 110.

The cap plate 120, according to an embodiment, may include a safety vent 122. If the inside pressure of the case 110 becomes excessively high, the safety vent 122, according to this embodiment, may rupture to release gas or pressure from an inside of the case 110.

The cap plate 120, according to an embodiment, may include an electrolyte inlet 124. In an embodiment, after the cap plate 120 is coupled to the case 110, electrolyte may be injected into the case 110 through the electrolyte inlet 124, and then the electrolyte inlet 124 may be sealed or closed.

In an embodiment, the first terminal 130 which is electrically connected to the first electrode plate 152, and the second terminal 140 which is electrically connected to the second electrode plate 154, may each be coupled to the cap plate 120. In addition, the first insulator 160, according to an embodiment, may be positioned between the cap plate 120 and the first terminal 130, and the second insulator 170, according to an embodiment, may be positioned between the cap plate 120 and the second terminal 140.

The first terminal 130, in an embodiment, may include a first collector 132 and a first terminal plate 134, where the first terminal plate 134 may have a flat shape formed integrally with the first collector 132. The first terminal 130, in an embodiment, may be formed from a first material, for example, the aluminum used to form the first electrode plate 152.

The first collector 132, in an embodiment, penetrates the first insulator 160 and is coupled to the first non-coating portion 152b, for example, by welding. In an embodiment where both the first collector 132 and the first non-coating portion 152b may be formed of aluminum, the first collector 132 and the first non-coating portion 152b may be coupled, for example, welded together having a high bond strength because the welding is performed on parts formed of the same material.

The first terminal plate 134 to which a bus bar 180 will be coupled, in an embodiment, may include a first guide 136 formed by bending an end portion of the first terminal plate 134. The first guide 136, according to an embodiment, may guide the position of the bus bar 180, and since a boundary line between the first guide 136 and the bus bar 180 may define a welding line W, described in detail below, a welding position of the bus bar 180 may be determined by the first guide 136.

The first insulator 160, according to an embodiment, may insulate the first terminal 130 from the cap plate 120 and the case 110. A region of the first insulator 160, according to an embodiment, may include a recess defining a first gap 162 partially between the first insulator 160 and the first terminal plate 134.

As described in further detail below, the first gap 162, in an embodiment, may overlap with the bus bar 180 positioned on the first terminal plate 134 in order to prevent heat transfer toward the cap plate 120 and thermal deformation of the first insulator 160 during a welding operation of the first terminal plate 134 and the bus bar 180.

The second terminal 140, in an embodiment, may include a second collector 142 and a second terminal plate 144, where the second terminal plate 144 may have a flat shape formed integrally with the second collector 142. The second terminal plate 144, in an embodiment, may include a first part 144a and a second part 144b that are formed of different materials. The first part 144a and the second collector 142, according to an embodiment, may be formed of a second material, and the second part 144b, in an embodiment, may be formed of the first material used to form the first terminal 130. In an embodiment, the first material may be aluminum, and the second material may be copper.

The second collector 142, according to an embodiment, may penetrate the second insulator 170 insulating the second terminal 140 from the cap plate 120 and the case 110, and may then be coupled to the second non-coating portion 154b, for example, by welding. In an embodiment, since both the second collector 142 and the second non-coating portion 154b may be formed of the same material, for example, copper, the second collector 142 and the second non-coating portion 154b may be coupled, for example, welded together having a high bond strength because the welding is performed on parts formed of the same material.

The first part 144a, according to an embodiment, may be formed integrally with the second part 144b, and a bus bar 180 may be coupled to the second part 144b. The second part 144b, in an embodiment, may include a second guide 146 formed by bending an end portion of the second part 144b. The second guide 146, according to an embodiment, may guide the position of the bus bar 180, and since a boundary line between the second guide 146 and the bus bar 180 may define a welding line W, described in detail below, a welding position of the bus bar 180 may be determined by the second guide 146.

The second insulator 170, according to an embodiment, may insulate the second terminal 140 from the cap plate 120 and the case 110. A region of the second insulator 170, in an embodiment, may include a recess defining a second gap 172 partially between the second insulator 170 and the second terminal plate 144. The second gap 172, in an embodiment, may overlap with the bus bar 180 positioned on the second terminal plate 144 in order to prevent heat transfer toward the cap plate 120 and thermal deformation of the second insulator 170 during a welding operation of the second terminal plate 144 and the bus bar 180.

The bus bars 180, in an embodiment, electrically couple the secondary batteries 100, for example, by connecting the first terminals 130 and the second terminals 140 of each of the secondary batteries 100 adjacent to each other. In an embodiment, a bus bar 180 may be coupled to a first terminal plate 134 and a second part 144b of a pair of neighboring secondary batteries 100 of the secondary batteries 100, for example, by welding.

As shown in the embodiment depicted in FIG. 5, a bus bar 180 may be in contact with the first guide 136 of the first terminal plate 134 and the second guide 146 of the second part 144b, and then the bus bar 180, according to the embodiment, may be coupled, for example, welded, so that a straight welding line W may be formed along a boundary line between the bus bar 180 and the first guide 136 and a boundary line between the bus bar 180 and the second guide 146.

The first guide 136 and the second guide 146, according to an embodiment, may be equal in thickness to the bus bar 180. According to an embodiment, a top surface of the bus bar 180 may be aligned with top surfaces of the first and second guides 136 and 146 along the same line prior to welding the bus bar 180. Therefore, as compared with the example in which the bus bar 180 is welded after being superposed on the first terminal plate 134 or the second terminal plate 144, the bus bar 180, according to these embodiments, may be welded more easily requiring less laser power.

In addition, as described above, since each of the bus bar 180, the first terminal plate 134, and the second part 144b may be formed of the first material (for example, aluminum) in an embodiment, the bus bar 180 may be welded to the first terminal plate 134 and the second part 144b having a high bond strength because the welding is performed on parts formed of the same material. In addition, in this embodiment, since welding is more easily performed on aluminum than copper, for example, the weldability between the bus bar 180 and the first terminal plate 134 and the weldability between the bus bar 180 and the second part 144b may be improved.

Figure 6:
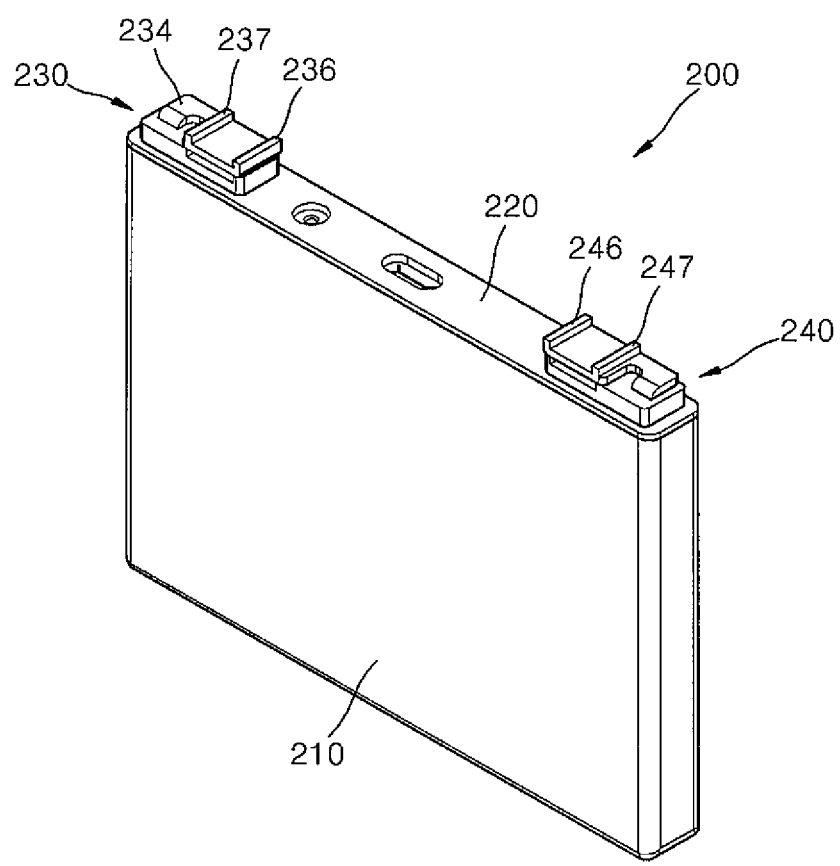
FIG. 6 is a perspective view illustrating a secondary battery according to another embodiment of the present invention.
Figure 7:
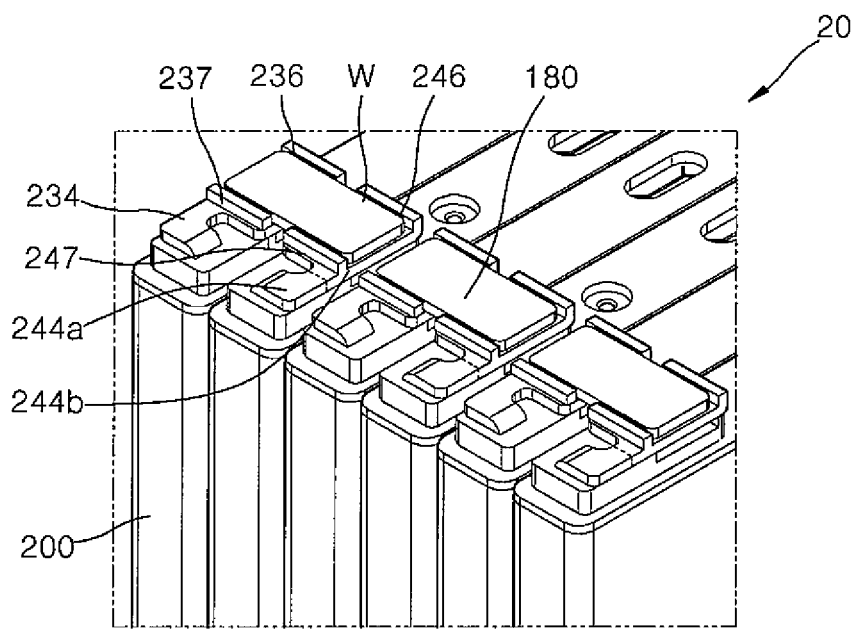
FIG. 7 is a perspective view illustrating a portion of a secondary battery module including the secondary battery depicted in FIG. 6, according to an embodiment of the present invention.

FIG. 6 is a perspective view illustrating a secondary battery 200 according to another embodiment of the present invention; and FIG. 7 is a perspective view illustrating a portion of a secondary battery module 20 including secondary batteries 200 such as that depicted in FIG. 6, according to an embodiment of the present invention.

First, referring to the embodiment illustrated in FIG. 6, the secondary battery 200 may include a case 210 accommodating an electrode assembly, a cap plate 220 sealing the case 210, and a first terminal 230 and a second terminal 240 each coupled to the cap plate 220.

The case 210 and the cap plate 220, according to an embodiment, have the same structures as the case 110 and the cap plate 120 described with reference to FIGS. 1 through 5. Thus, descriptions of the case 210 and the cap plate 220 have been omitted.

The first terminal 230, in an embodiment, includes a first terminal plate 234. The first terminal plate 234, in an embodiment, includes a first guide 236 formed by bending an end portion of the first terminal plate 234. In addition, the first terminal plate 234, in an embodiment, further includes a first protrusion 237 protruding outward from a top surface of the first terminal plate 234 and spaced apart from yet parallel with the first guide 236.

The first protrusion 237 and the first terminal plate 234, in an embodiment, may be formed integrally, for example, using the first material. In an embodiment, the first protrusion 237 and the first guide 236 may have the same height or thickness.

The second terminal 240, according to an embodiment, includes a first part 244a and a second part 244b that are integrally formed. The first part 244a, according to an embodiment, may be formed from the second material (for example, copper), and the second part 244b, according to an embodiment, may be formed from the first material (for example, aluminum) used to form the first terminal 230.

The second part 244b, according to an embodiment, includes a second guide 246 formed by bending an end portion of the second part 244b. In addition, the second part 244b, in an embodiment, further includes a second protrusion 247 protruding outward from a top surface of the second part 244b and spaced apart from yet parallel with the second guide 246. The second protrusion 247 and the second part 244b, in an embodiment, may be integrally formed, for example, using the first material. In an embodiment, the second protrusion 247 and the second guide 246 may have the same height or thickness.

FIG. 7 illustrates the secondary battery module 20 according to an embodiment in which the secondary batteries 200 are coupled through bus bars 180.

Referring to the embodiment illustrated in FIG. 7, a first side of a bus bar 180 may be positioned between the first protrusion 237 and the first guide 236 of a secondary battery 200, and the other side of the bus bar 180 may be positioned between the second protrusion 247 and the second guide 246 of a neighboring secondary battery 200. The bus bar 180, in this embodiment, is coupled, for example, welded, to form straight welding lines W along boundary lines among the bus bar 180, the first protrusion 237, the first guide 236, the second protrusion 247, and the second guide 246.

In an embodiment, the first protrusion 237, the first guide 236, the second protrusion 247, and the second guide 246 may define an assembling position of the bus bar 180 during welding of the bus bar 180, and may prevent the bus bar 180 from separating from the assembling position. Therefore, the efficiency of the welding process may be improved, according to embodiments of the present invention.

In addition, since each of the first protrusion 237, the first guide 236, and the second protrusion 247, according to an embodiment, may be formed of the same material as that used to form the bus bar 180, a high bond strength may be guaranteed therebetween.

In addition, in an embodiment, the first protrusion 237, the first guide 236, the second protrusion 247, and the bus bar 180 have the same height or thickness, and may be coupled, for example, welded, along straight lines such that that the top surfaces thereof are aligned and the welding process may be easily performed.

As described above, according to one or more of the above embodiments of the present invention, when the bus bars 180 are joined to the secondary batteries 100 and/or 200, according to embodiments of the present invention, the positions of the bus bars 180 may be easily determined, and the bond strength between the bus bars 180 and the secondary batteries 200 may increase.

The effects of the embodiments of the present invention may be better understood from the above description with reference to the accompanying drawings.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising:
   an electrode assembly comprising a first electrode plate, a second electrode plate, and a separator between the first and second electrode plates;
   a case accommodating the electrode assembly;
   a cap plate coupled to the case;
   a first terminal and a second terminal each comprising a flat shape and each coupled to the cap plate,
   wherein the first terminal comprises a first terminal plate electrically coupled to the first electrode plate and further comprises a first material and wherein a first collector is integral as a single component with the first terminal plate and penetrates through the cap plate, and
   wherein the second terminal comprises a second terminal plate electrically coupled to the second electrode plate and further comprises a first part comprising a second material different from the first material, and a second part integral with the first part and comprising the first material; and
   a first insulator directly contacting the first terminal plate and the cap plate and defining a first gap directly between the first insulator and the first terminal plate.

2. The secondary battery of claim 1, wherein the first collector penetrates through the first insulator and is coupled to the first electrode plate, and
   wherein the first electrode plate and the first collector each comprises the first material.

3. The secondary battery of claim 2, wherein the first terminal plate comprises a first guide at an end portion.

4. The secondary battery of claim 3, wherein the first terminal plate further comprises a first protrusion extending out from a top surface of the first terminal plate parallel with the first guide, the first protrusion being spaced from the first guide.

5. The secondary battery of claim 1, further comprising a second insulator between the second terminal plate and the cap plate and defining a second gap between the second insulator and the second terminal plate.

6. The secondary battery of claim 5, wherein the second terminal further comprises a second collector integral with the first part and penetrating the second insulator to couple to the second electrode plate, and
   wherein the second electrode plate and the second collector each comprises the second material.

7. The secondary battery of claim 6, wherein the second part comprises a second guide at an end portion.

8. The secondary battery of claim 7, wherein the second part further comprises a second protrusion extending out from a top surface of the second part parallel with the second guide, the second protrusion being spaced from the second guide.

9. A secondary battery module comprising:
   a plurality of secondary batteries arranged parallel with each other; and
   a plurality of bus bars electrically coupling adjacent secondary batteries of the plurality of secondary batteries,
   wherein each secondary battery of the plurality of secondary batteries comprises:
   an electrode assembly comprising a first electrode plate, a second electrode plate, and a separator between the first and second electrode plates;
   a case accommodating the electrode assembly;
   a cap plate coupled to the case; and
   a first terminal and a second terminal each comprising a flat shape and each coupled to the cap plate; and
   a first insulator directly contacting the first terminal plate and the cap plate and defining a first gap directly between the first insulator and the first terminal plate;
   wherein the first terminal comprises a first terminal plate electrically coupled to the first electrode plate and further comprises a first material and wherein a first collector is integral as a single component with the first terminal plate and penetrates through the cap plate,
   wherein the second terminal comprises a second terminal plate electrically coupled to the second electrode plate and further comprises a first part comprising a second material different from the first material, and a second part integral with the first part and comprising the first material, and
   wherein the plurality of bus bars comprise the first material, each of the bus bars of the plurality of bus bars being coupled to the first terminal plate and the second part of a pair of adjacent secondary batteries of the plurality of secondary batteries.

10. The secondary battery module of claim 9, wherein each secondary battery further comprises a second insulator directly contacting the second terminal plate and the cap plate and defining a second gap directly between the second insulator and the second terminal plate.

11. The secondary battery module of claim 10, wherein the first gap and the second gap of each secondary battery overlap with the respective bus bar of the plurality of bus bars.

12. The secondary battery module of claim 10, wherein the first terminal of each secondary battery further comprises a first collector integral with the first terminal plate and penetrating through the first insulator to couple to the first electrode plate, the first electrode plate and the first collector each comprising the first material, and
   wherein the second terminal further comprises a second collector integral with the first part and penetrating through the second insulator to couple to the second electrode plate, the second electrode plate and the second collector each comprising the second material.

13. The secondary battery module of claim 9, wherein the first terminal plate of each secondary battery comprises a first guide at an end portion, the first guide contacting a bus bar, and defining a welding line at a boundary between the first guide and the bus bar.

14. The secondary battery module of claim 13, wherein the first terminal plate of each secondary battery further comprises a first protrusion extending out from a top surface of the first terminal plate with the bus bar between the first protrusion and the first guide.

15. The secondary battery module of claim 14, wherein the first protrusion, the first guide, and the bus bar of each secondary battery have the same thickness.

16. The secondary battery module of claim 9, wherein the second part of each secondary battery comprises a second guide at an end portion, the second guide contacting a bus bar, and defining a welding line at a boundary between the second guide and the bus bar.

17. The secondary battery module of claim 16, wherein the second part of each secondary battery further comprises a second protrusion extending out from a top surface of the second part, with the bus bar between the second protrusion and the second guide.

18. The secondary battery module of claim 17, wherein the second protrusion, the second guide, and the bus bar of each secondary battery have the same thickness.

19. The secondary battery module of claim 9, wherein the first material comprises aluminum, and the second material comprises copper.

* * * * *